(No Model.)
H. F. THURSTON.
CULINARY VESSEL.
No. 481,316. Patented Aug. 23, 1892.
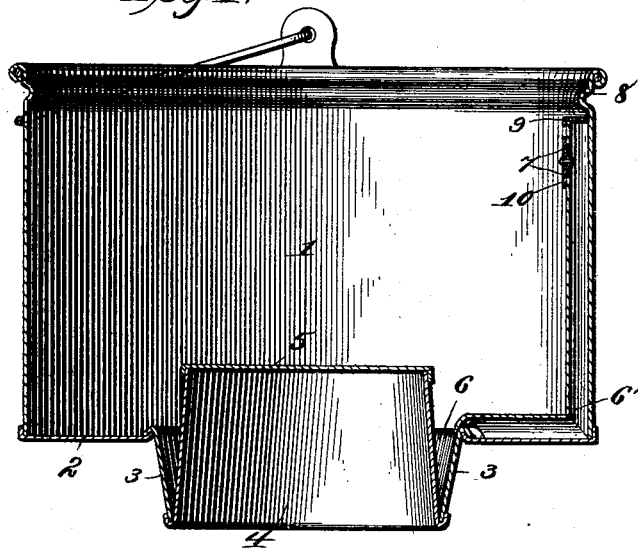
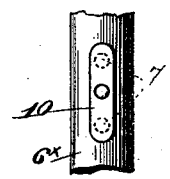
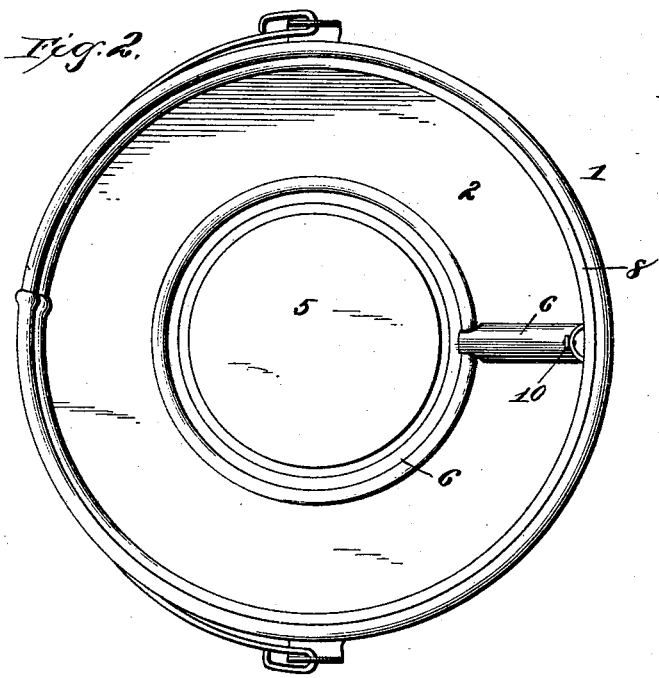
Witnesses
E. C. Sturdeman
H. J. Riley
Inventor
H. F. Thurston
By his Attorneys,
C. A. Snow & Co.

UNITED STATES PATENT OFFICE.

HARRISON FRANKLIN THURSTON, OF CENTRE BARTLETT, NEW HAMPSHIRE.

CULINARY VESSEL.

SPECIFICATION forming part of Letters Patent No. 481,316, dated August 23, 1892.

Application filed December 22, 1891. Serial No. 415,928. (No model.)

*To all whom it may concern:*

Be it known that I, HARRISON FRANKLIN THURSTON, a citizen of the United States, residing at Centre Bartlett, in the county of Carroll and State of New Hampshire, have invented a new and useful Culinary Vessel, of which the following is a specification.

The invention relates to improvements in culinary vessels.

The object of the present invention is to provide a culinary vessel in which food substances will be simultaneously baked and steamed and in which such substances will be rapidly cooked.

The invention consists in the construction and novel combination and arrangement of parts hereinafter fully described, illustrated in the accompanying drawings, and pointed out in the claims hereto appended.

In the drawings, Figure 1 is a vertical sectional view of a culinary vessel constructed in accordance with this invention. Fig. 2 is a plan view. Fig. 3 is a detail view to show more clearly the arrangement of the button.

Like numerals of reference indicate corresponding parts in all the figures of the drawings.

1 designates a cylindrical vessel, the bottom 2 of which has a central circular opening and is provided with a depending circular flange 3, slightly tapering toward the lower end. The lower end of the flange 3 is secured to the lower edge of a hot-air box or chamber 4, which has its bottom open, its top 5 closed, and its sides gradually tapering toward the top. The hot-air chamber forms with the flange 3 a narrow V-shaped annular groove or cavity 6, in which water is rapidly heated by the hot air rising in the chamber 4.

In cooking the vessel is partially filled with water, the water rising to the top of the chamber 4, and the food substance to be cooked is baked at the bottom of the vessel, and steam from the V-shaped groove or cavity and the lower part of the vessel rises through an L-shaped tube and is directed upon the substance being cooked. The L-shaped tube 6<sup>×</sup> extends along the bottom 2 from the V-shaped recess or cavity to one side of the vessel, and thence up the side to within a short distance of the top, and is provided with discharge-openings 7. The L-shaped tube is formed by an L-shaped piece, which is fitted against the adjacent parts of the vessel and which is semi-tubular or semi-cylindrical in cross-section. This L-shaped piece has its concave faces arranged opposite the side and bottom of the vessel, and the longitudinal edges are fitted closely against and secured to the vessel, thereby forming the L-shaped tube. The upper edge of the vessel is provided with a groove 8, which is adapted to receive a suitable cover (not shown) of ordinary construction and to form a close joint.

The semi-tubular or semi-cylindrical L-shaped part, which is secured to one side and to the bottom of the vessel, consists of two arms secured together at the angle. By this construction a food substance may be rapidly cooked, and it is simultaneously baked and steamed. These improvements are applicable to all kinds of cooking-vessels, such as kettles, pots, pans, and the like.

The top of the L-shaped tube 6 is provided with a water-tight cap 9, and a button 10 is pivoted at its center between the discharge-openings 7 and is adapted to close them when arranged longitudinally of the tube and to open the discharge-opening when turned transversely of the tube. When the upper end of the tube and the discharge-openings are closed, the steam is returned to the V-shaped groove at the fire and boiling of the water within the vessel is quickly produced.

The culinary vessel may be either used with the discharge-openings free or closed, and when free or open steam escapes from them.

What I claim is—

1. The combination of a vessel provided in its bottom with a central opening and having a flange depending therefrom, a hot-air chamber secured to the flange and extending upward within the vessel, and an L-shaped tube extending along the bottom and one side of the vessel and provided at its upper end with a discharge-opening, substantially as described.

2. The combination of a vessel provided in its bottom with a circular opening and having a circular flange depending therefrom and tapering toward the lower end, an approximately cylindrical chamber having an open bottom and closed top and tapering sides and secured to the lower edge of the flange and forming a narrow annular V-shaped groove, and an L-shaped tube extending from the V-shaped groove along the bottom and side of the vessel to the top of the same and provided at its upper end with a discharge-opening, substantially as described.

3. The combination of a vessel provided in its bottom with a circular opening and having a circular flange depending therefrom and tapering toward the lower end and an approximately cylindrical chamber having an open bottom and closed top and tapering sides and secured to the lower edge of the flange, and forming a narrow annular V-shaped groove, substantially as described.

4. The combination of a vessel provided in its bottom with an annular groove, an L-shaped tube arranged inside the vessel and extending vertically along one side of the same and across the bottom from that side to the annular groove, a cap closing the upper end of the tube, and a button pivoted intermediate its ends to the tube, the latter being provided with discharge-openings arranged to be closed by the button, substantially as described.

In testimony that I claim the foregoing as my own I have hereto affixed my signature in the presence of witnesses.

HARRISON FRANKLIN THURSTON.

Witnesses:
   A. B. PRATT,
   A. W. BURNELL,
   L. PITMAN,
   G. W. M. PITMAN.